Patented June 29, 1926.

1,590,965

UNITED STATES PATENT OFFICE.

CHARLES R. DOWNS, OF CLIFFSIDE, NEW JERSEY, ASSIGNOR TO THE BARRETT COMPANY, A CORPORATION OF NEW JERSEY.

PURIFICATION OF HYDROCARBONS.

No Drawing. Application filed July 7, 1920. Serial No. 394,570.

This invention relates to the purification of chemical compounds. It relates more particularly to the purification of aromatic hydrocarbons and will be described in connection therewith.

This invention utilizes the principle that a chemical compound contaminated by the presence of an undesirable compound or compounds may be freed from a large part or all of one or more of such objectionable compounds by subjecting the impure mixture to such conditions that a large part of the chemical compound which it is desired to purify remains unchanged while one or more of the impurities are converted into other compounds that are more readily separated from the compound to be purified than the original impurities.

In carrying out this invention aromatic hydrocarbons such as benzene, toluene, xylene, phenol, naphthalene, anthracene, etc. containing impurities such as thiophene, carbon bisulfide or other sulfur compounds, unsaturated hydrocarbons, etc., which are readily oxidized, are passed in the vapor phase in the presence of an oxygen containing gas into contact with a suitable catalyzer maintained at such a temperature that the impurities will be largely oxidized while the aromatic hydrocarbon will not be oxidized to any great extent, if any. It is now known that under proper conditions benzene can be oxidized in the vapor phase in the presence of a suitable catalyst to produce a certain amount of quinone and maleic acid; naphthalene can also be oxidized in a similar manner to produce phthalic acid; anthracene to produce anthraquinone, etc., but none of the prior processes appear to recognize the fact that commercial aromatic hydrocarbons contain impurities that can be readily gotten rid of by a similar oxidation treatment while retaining much of the aromatic hydrocarbon unchanged but greatly purified from the presence of the other substances.

The invention will be more particularly described in connection with the purification of commercial benzene or benzol to obtain benzene that is substantially or entirely chemically pure, but it is to be understood that the invention is not confined to the purification of this particular compound. The invention is also applicable to the treatment of impure compounds in such a manner that one or more of the impurities are converted into other compounds whose presence is less objectionable than the original impurity or can be more easily removed or separated out than the original impurity could be.

Ordinary commercial benzene usually contains some impurities such as thiophene, carbon bisulfide, and unsaturated bodies that can be oxidized in the presence of a catalyzer without causing an undue amount of oxidation of the benzene. Furthermore, the oxidation of that portion of the benzene that becomes oxidized can be caused to take place in a selective or partial manner so that useful products such as maleic acid and quinone may be produced in appreciable quantities, without a large amount of complete combustion of the benzene taking place.

The impure benzene mixture may be passed through a hot contact chamber in the vapor phase into contact with vanadium oxide as a catalyzer, for example, as described in the patent to Weiss and Downs, No. 1,318,633, granted Oct. 14, 1919, whereupon the impurities become oxidized to produce fixed gases such as $CO_2$, CO, sulfur oxides, etc., and $H_2O$ while complete combustion of a small portion of the benzene itself may take place together with a certain amount of selective oxidation of some more of the benzene to quinone and maleic acid. A substantial portion of the benzene passes through the contact chamber unchanged and may be separated from the reaction products in any suitable manner.

A large number of substances will act as catalysts in this process, among which may be mentioned vanadium and molybdenum oxides, gold, oxides of tungsten, ruthenium, cobalt, copper, manganese, lead, chromium, antimony, cadmium, aluminium, and thorium. Elements and compounds containing the elements of the fifth and sixth groups of the periodic system seem to be the most suitable classes of substances for this purpose.

The temperature at which the catalyst should be maintained will depend upon several different factors, such as the pressure maintained in the system, the sort of catalyst used, the proportion of oxygen to benzene, the amount of diluent gases present, the nature of the impurities it is desired to eliminate, the time of contact, etc. At temperatures above 550° C. an objectionable amount of benzene is oxidized or polymerized and at temperatures much below 250° C. an insufficient amount of the impurities usually found in commercial benzene is oxidized for satisfactory results so these two temperatures may be regarded as near the limits within which the process can be satisfactorily practiced. When vanadium oxide is used as a catalyst with air and benzene in the proportions of about one part of air to one of benzene the mixture is kept in contact with the catalyst for about one-quarter of a second to purify the benzene from thiophene, carbon bi-sulfide and unsaturated hydrocarbons by oxidizing these latter compounds without oxidizing so much benzene as to produce considerable losses. The different factors may be varied considerably in ways which will readily occur to those skilled in this art, without departing from the spirit and scope of the invention.

The following procedure for separating the reaction products has been followed in actual practice and found to be feasible when benzene is being purified. The exit gases from the reaction chamber or contact box are bubbled through cool water where the $H_2O$, some benzene, maleic acid, which is soluble in water, and part of the quinone which is slightly soluble, are removed. The uncondensed residue containing benzene vapors, $CO_2$, $N_2$, etc., is passed into a cold condenser where more of the benzene and a considerable portion of the quinone are condensed. The remaining gaseous mixture of benzene, quinone, $CO_2$, etc. is passed upwardly through a tower down which flows "straw oil" which absorbs practically all of the remaining benzene and quinone while the fixed gases pass off.

The benzene and quinone are then distilled from the "straw oil" and the benzene and quinone mixtures already condensed are mixed therewith. This general mixture contains benzene together with quinone, maleic acid, and "straw oil" as impurities which can be removed by washing with $H_2SO_4$ and NaOH followed by a distillation whereby the pure benzene is obtained. The above described method of recovering the pure benzene is given merely as illustrative of one of the methods that may be used for this purpose.

It will be observed that the benzene entering the catalytic contact chamber contained impurities which could be removed heretofore only by employing expensive chemical methods which usually resulted in the loss of a large part of the benzene. By the present method these impurities are rapidly and economically converted into other compounds that readily pass off as gases while other impurities are produced which can be readily separated from the benzene. These latter impurities are produced while a selective or partial oxidation of the benzene may occur simultaneously with the destruction of the former impurities; and the partial oxidation products of the benzene are themselves valuable compounds.

When benzene, its homologues, their derivatives or naphthalene or other aromatic hydrocarbons and their derivatives are treated in accordance with this process, the temperature, time of contact, etc., will be varied to suit the particular needs. In all cases the impure compound will be passed in the vapor through a hot contact chamber containing a catalyst under such conditions that a large amount of the compound itself will pass through unchanged while the impurities or a large portion of the same will be converted into other compounds that may be more easily separated from the compound that is to be purified than the original impurities were.

I claim:—

1. The herein described process which comprises passing an impure aromatic hydrocarbon in the vapor phase and an oxygen containing gas into contact with a catalyst at a temperature between 250° C. and 550° C., the oxygen concentration of said gas being such that oxidation of the impurities takes place without substantial oxidation of the hydrocarbon.

2. The herein described process which comprises passing an impure aromatic hydrocarbon in the vapor phase and an oxygen containing gas in substantially the proportions of five parts of the hydrocarbon to one part of oxygen into contact with a catalyst at a temperature adapted to cause oxidation of the impurities without substantial oxidation of the hydrocarbon.

3. The process of separating an aromatic hydrocarbon from impurities which comprises passing said hydrocarbon and the impurities in the vapor phase and an oxygen containing gas into contact with a catalyst at a temperature between 250° C. and 550° C., the oxygen concentration of said gas being such as will cause oxidation of the impurities without substantial oxidation of the hydrocarbon and recovering the hydrocarbon in a substantially chemically pure state from the oxidation products.

4. The process of separating an aromatic hydrocarbon from impurities which comprises passing said hydrocarbon and the impurities in the vapor phase and an oxygen containing gas in substantially the proportions of five parts of the hydrocarbon to one part of oxygen into contact with a catalyst at a temperature between 250° C. and 550° C. and separating the unoxidized hydrocarbon from the oxidation products.

5. The herein described process which comprises passing commercial benzene in the vapor phase and an oxygen containing gas into contact with vanadium oxide as a catalyst at a temperature between 250° C. and 550° C., the oxygen concentration of said gas being such that oxidation of the impurities takes place without substantial oxidation of the benzene and separating the unoxidized benzene from the oxidation products.

6. The herein described process which comprises passing a mixture containing benzene and thiophene in the vapor phase and an oxygen containing gas into contact with a catalyst at a temperature between 250° C. and 550° C., the oxygen concentration of said gas being such that oxidation of the thiophene takes place without substantial oxidation of the benzene.

7. The herein described process which comprises passing a mixture containing benzene and thiophene, carbon bisulfide and an unsaturated hydrocarbon in the vapor phase in the presence of an oxygen containing gas into contact with vanadium oxide as a catalyst at a temperature between 250° C. and 550° C., the oxygen concentration of said gas being such that oxidation of the thiophene, carbon bisulfide and unsaturated hydrocarbon takes place without substantial oxidation of the benzene.

8. The herein described process which comprises passing a mixture containing benzene and thiophene in the vapor phase in the presence of an oxygen containing gas into contact with vanadium oxide as a catalyst at a temperature between 250° C. and 550° C., the oxygen concentration of said gas being such that oxidation of the thiophene takes place without substantial oxidation of the benzene and separating the unchanged benzene from the products of oxidation.

9. The herein described process which comprises passing commercial benzene in the vapor phase and an oxygen containing gas in substantially the proportions of five parts of benzene to one part of oxygen into contact with vanadium oxide as a catalyst at a temperature between 250° and 550° C.

10. The herein described process which comprises passing commercial benzene in the vapor phase and an oxygen containing gas in substantially the proportions of five parts of benzene to one part of oxygen into contact with a catalyst at a temperature adapted to cause oxidation of impurities in the benzene and separating unoxidized benzene from the oxidation products.

In testimony whereof I affix my signature.

CHARLES R. DOWNS.